(12) United States Patent
Walesa

(10) Patent No.: US 9,829,179 B2
(45) Date of Patent: Nov. 28, 2017

(54) PARABOLIC QUADRANT LED LIGHT FIXTURE

(71) Applicant: Phillip Walesa, Lomira, WI (US)

(72) Inventor: Phillip Walesa, Lomira, WI (US)

( * ) Notice: Subject to any disclaimer, the term of this patent is extended or adjusted under 35 U.S.C. 154(b) by 0 days.

(21) Appl. No.: 14/556,717

(22) Filed: Dec. 1, 2014

(65) Prior Publication Data
US 2015/0377452 A1 Dec. 31, 2015

Related U.S. Application Data

(60) Provisional application No. 62/017,358, filed on Jun. 26, 2014.

(51) Int. Cl.
| | |
|---|---|
| *F21V 7/06* | (2006.01) |
| *F21V 29/71* | (2015.01) |
| *F21V 29/83* | (2015.01) |
| *B64D 47/04* | (2006.01) |
| *F21S 8/10* | (2006.01) |
| *F21W 101/10* | (2006.01) |
| *F21W 101/06* | (2006.01) |
| *F21Y 101/00* | (2016.01) |
| *F21Y 115/10* | (2016.01) |
| *F21Y 107/30* | (2016.01) |

(52) U.S. Cl.
CPC ............... *F21V 7/06* (2013.01); *B64D 47/04* (2013.01); *F21S 48/1104* (2013.01); *F21S 48/1159* (2013.01); *F21S 48/1323* (2013.01); *F21S 48/328* (2013.01); *F21V 29/717* (2015.01); *F21V 29/83* (2015.01); *B64D 2203/00* (2013.01); *F21W 2101/06* (2013.01); *F21W 2101/10* (2013.01); *F21Y 2101/00* (2013.01); *F21Y 2107/30* (2016.08); *F21Y 2115/10* (2016.08)

(58) Field of Classification Search
CPC .......... F21V 7/06; F21V 29/717; F21V 13/04; F21V 29/83; F21S 8/00; F21S 48/1159; F21S 48/328; B64D 2203/00
USPC ......................................................... 362/240
See application file for complete search history.

(56) References Cited

U.S. PATENT DOCUMENTS

| | | | | |
|---|---|---|---|---|
| 1,432,872 | A | * | 10/1922 | Kroehle ................... B60Q 1/44 362/812 |
| 6,053,623 | A | | 4/2000 | Jones et al. |
| 7,112,916 | B2 | | 9/2006 | Goh et al. |
| 7,172,319 | B2 | | 2/2007 | Holder et al. |
| 7,281,823 | B2 | * | 10/2007 | Moisel ................. F21S 48/1136 362/294 |
| 7,347,589 | B2 | | 3/2008 | Ge |
| 7,497,596 | B2 | | 3/2009 | Ge |

(Continued)

*Primary Examiner* — Sean Gramling

(57) ABSTRACT

The present invention is a lighting fixture device with a frustoconical housing. The frustoconical housing has a housing edge and an inner housing chamber accessible by a housing aperture. This inner housing chamber includes a parabolic reflective surface with multiple symmetrical reflective sections. Each reflective section includes at least one focal point. The device also includes an LED board mounting post forming a vertical axis through the vertex of the parabolic reflective surface. The LED board mounting post includes at least one mounting surface, to which is mounted multiple LED boards. Each LED board includes at least one LED. A central axis of each LED is aligned with at least one of the focal points.

18 Claims, 2 Drawing Sheets

(56) References Cited

U.S. PATENT DOCUMENTS

| | | | |
|---|---|---|---|
| 7,517,088 B1* | 4/2009 | Kretzschmar | F21V 9/08 353/100 |
| 7,736,027 B2 | 6/2010 | Ge | |
| 8,192,057 B2 | 6/2012 | Dassanayake et al. | |
| 8,449,137 B2 | 5/2013 | Dassanayake et al. | |
| 8,616,724 B2 | 12/2013 | Pickard et al. | |
| 2003/0048634 A1* | 3/2003 | You | B64F 1/20 362/153.1 |
| 2003/0227774 A1* | 12/2003 | Martin | F21K 9/00 362/240 |
| 2005/0265024 A1* | 12/2005 | Luk | F21S 10/02 362/231 |
| 2007/0274089 A1* | 11/2007 | Harris | F21S 8/022 362/545 |
| 2010/0295439 A1 | 11/2010 | Oechsle et al. | |
| 2011/0216523 A1* | 9/2011 | Tong | F21K 9/50 362/84 |
| 2011/0310608 A1* | 12/2011 | Lapatovich | F21K 9/00 362/249.02 |
| 2012/0140481 A1 | 6/2012 | Simchak | |
| 2012/0327665 A1* | 12/2012 | Pickard | F21K 9/137 362/294 |
| 2014/0268771 A1* | 9/2014 | Heikman | F21K 9/135 362/249.02 |

* cited by examiner

PARABOLIC QUADRANT LED LIGHT FIXTURE

CROSS-REFERENCE TO RELATED APPLICATIONS

This application claims priority to U.S. Provisional Application No. 62/017,358 filed on Jun. 26, 2014, which is hereby incorporated by reference in its entirety.

FIELD OF INVENTION

This invention relates to the field of illumination, and more specifically to a light source including multiple light emitting diodes and a parabolic reflector.

BACKGROUND

Modern aircraft require high intensity landing lights for any nighttime operations in order to observe terrain during takeoff and landing, and to avoid any obstacles during operation. Landing lights also increase visibility to other aircraft and airport controllers. In emergencies, landing lights can provide a rudimentary communication ability if other avenues of communication are unavailable.

Landing lights must have a very high intensity because of the considerable distance that may separate an aircraft from terrain, obstacles or observers. Ideally, landing lights are extremely intense, lightweight, require little electrical power and are readily serviceable to prevent scheduling delays and reduce the risk that a landing light will become inoperable during flight.

High intensity lights have numerous other uses. Such lights illuminate disaster areas to assist rescue and reconstruction efforts. These lights can also assist similar efforts as searchlights and floodlights. High intensity lights illuminate streets and bridges, provide light to secure areas and reduce the risk of crime. Stadiums, playing fields, arenas, theaters and other sports and entertainment venues utilize high intensity lights to provide spectators with a more easily observed match or show. High intensity headlights can provide the drivers of freight and passenger trains with a greater field of view, resulting in safer transportation.

One type of widely used high intensity light is a parabolic reflector lamp. These lamps, while relatively lightweight, still provide an intense pool of light, which supplies sufficient illumination to see and be seen from lengthy distances. Parabolic reflector lamps operate as sealed units, which reduces their drag during travel, if attached to a moving vehicle, and prevents atmospheric conditions such as rain and snow from interfering with their operation.

Unfortunately, parabolic reflector lamps have significant drawbacks. Because these lamps are sealed, if the filament burns out a user must discard and replace the entire unit, resulting in an unnecessary waste of resources. The filaments used are relatively expensive in terms of energy consumption and do not include a redundant illumination means if a filament burns out during operation.

These lamps also have little ability to cool themselves during operation, reducing the overall operating life. Moreover, the inability to reduce temperature during operation also increases the likelihood that a lamp activated for extended periods, such as an emergency situation, will burn out. Furthermore, these lamps are easily damaged during installation. While some prior art lamps thickened the housing and reflectors, this only exacerbates the problem of cooling while increasing the lamps' weight. This may render the prior art lamps unsuitable for situations calling for easily portable or lightweight lamps.

There is an unmet need in the art for a modular parabolic reflector lamp with reduced energy consumption and multiple illumination means.

There is a further unmet need in the art for a parabolic reflector lamp with a built-in cooling system and structural reinforcement that does not compromise the lamp's ability to discard heat.

SUMMARY OF THE INVENTION

The present invention is a lighting fixture device with a frustoconical housing. The frustoconical housing has a housing edge and an inner housing chamber accessible by a housing aperture. This inner housing chamber includes a parabolic reflective surface with multiple symmetrical reflective sections. Each reflective section includes at least one focal point. The device also includes an LED board mounting post forming a vertical axis through the vertex of the parabolic reflective surface. The LED board mounting post includes at least one mounting surface, to which is mounted multiple LED boards. Each LED board includes at least one LED. A central axis of each LED is aligned with at least one of the focal points.

TERMS OF ART

Figure 1A:
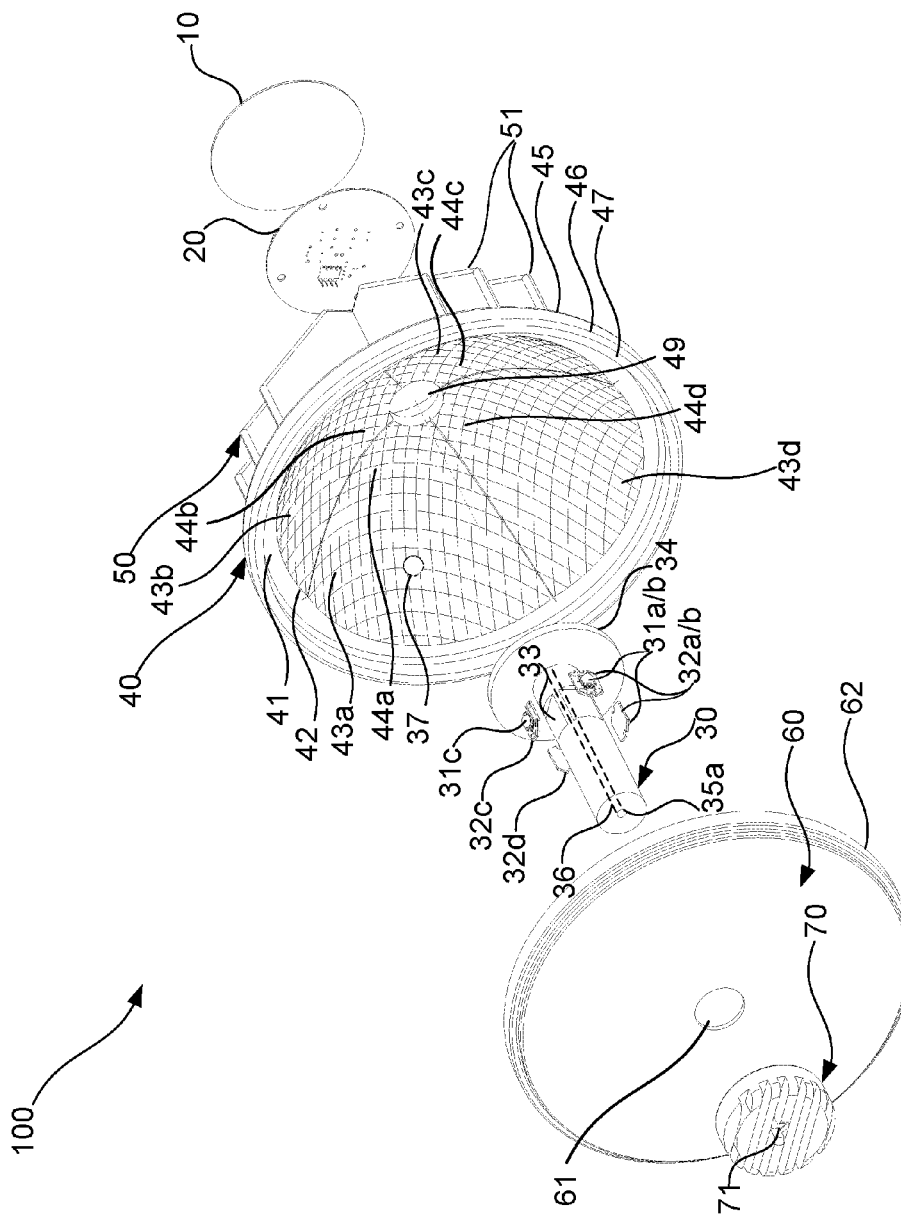
FIGS. 1a and 1b illustrate exploded front and back perspective views, respectively, of a parabolic quadrant LED light fixture ("ParQuad").

As used herein, the term "frustoconical" means a hollow conical structure having a flattened end of a first diameter and an open end of a second diameter through which an internal cavity can be accessed. A frustoconical structure may or not have an elongate tubular shape at one end.

As used herein, the term "LED" means a semiconductor diode that emits light.

As used herein, the term "parabolic" means a structure having a curved surface.

As used herein, the term "vertex" means the highest or lowest point of the surface of parabola where the parabola crosses its axis of symmetry.

DETAILED DESCRIPTION OF INVENTION

For the purpose of promoting an understanding of the present invention, references are made in the text to exemplary embodiments of a parabolic quadrant LED light fixture, only some of which are described herein. It should be understood that no limitations on the scope of the invention are intended by describing these exemplary embodiments. One of ordinary skill in the art will readily appreciate that alternate but functionally equivalent elements may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale. Instead, emphasis has been placed upon illustrating the principles of the invention. Like reference numerals in the various drawings refer to identical or nearly identical structural elements.

Moreover, the terms "about," "substantially" or "approximately" as used herein may be applied to modify any quantitative representation that could permissibly vary without resulting in a change in the basic function to which it is related.

Figure 1B:
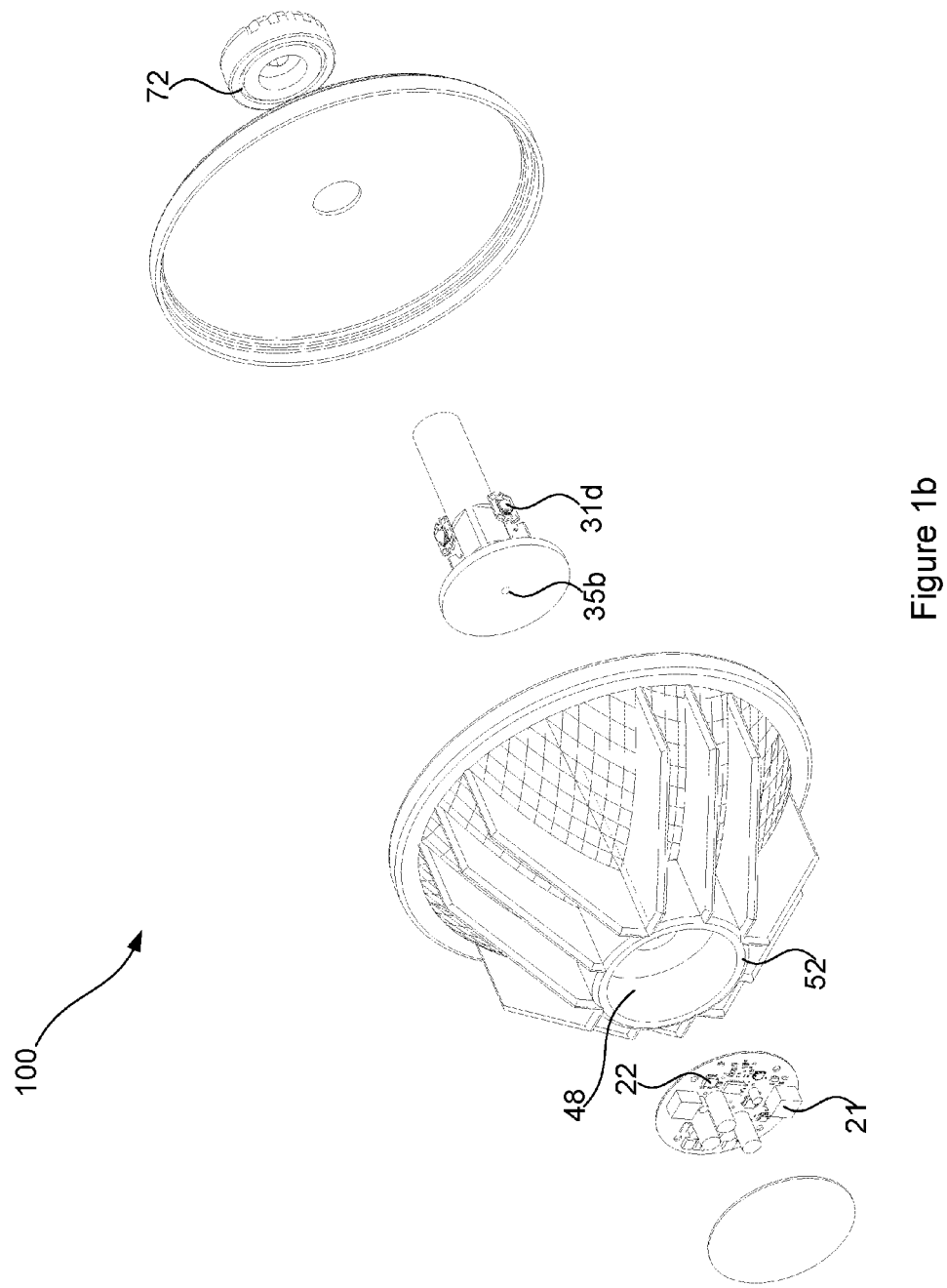

FIGS. 1a and 1b illustrate exploded front and back perspective views, respectively, of a ParQuad 100. ParQuad 100 includes an end cap 10, a circuit board 20, an LED board mounting post 30, a frustoconical housing 40, a heat sink assembly 50, a lens 60, and an optional outer heat sink cap 70.

End cap 10 removably attaches to frustoconical housing 40 through a threaded or snap-fit connection. Removal of end cap 10 allows removal of circuit board 20 and LED board mounting post 30.

Circuit board 20 connects to LED board mounting post 30. Circuit board 20 includes a power supply 21 and driver circuitry 22. Power supply 21 may be a power storage unit or a connection to an external power source. Driver circuitry 22 controls overall activation of ParQuad 100, as well as the brightness and activation of individual LEDs. This may occur through hard-coding driver circuitry 22 or through a wired or wireless connection to an external control unit.

LED board mounting post 30 includes multiple LEDs 31a-31d, multiple LED boards 32a-32d, at least one mounting surface 33, a circuit board support 34 and optionally at least two post apertures 35a and 35b and an airflow chamber 36. LED board mounting post 30 runs through the center of frustoconical housing 40 and extends through lens 60, where it is capped off and sealed by outer heat sink cap 70 so that no water can enter ParQuad 100. LED board mounting post 30 is removable for replacement, similar to a typical halogen bulb in an automotive headlight application. This enables reuse of all the remaining elements of ParQuad 100 with a new LED board mounting post 30.

LEDs 31a-31d are arranged around LED board mounting post 30 in a quad pattern 90 degrees clocked from each other. While the exemplary embodiment includes four LEDs 31a-31d, various other embodiments may include between two and one hundred LEDs. In the exemplary embodiment, LEDs 31a-31d may have wattage between one and one hundred watts. In the exemplary embodiment, LEDs 31a-31d may emit light in the visible or infrared spectrum.

Each LED 31a-31d is mounted to an LED board 32a-32d, respectively. While the exemplary embodiment includes four LED boards 32a-32d, various other embodiments may include between two and one hundred LED boards 32. In various embodiments, the LED boards 32a-32d may be wired such that if one of the LEDs or LED boards such as 31a or 32a becomes non-functional, operation of the remaining LEDs and LED boards, in this case 31b-31d and 32b-32d, is unaffected. Each of LED boards 32a-32d is connected via a wire connection to the other LED boards 32a-32d and to circuit board 20. LED board mounting post 30 includes at least one mounting surface 33, to which LED boards 32a-32d are mounted. In the exemplary embodiment, mounting surface 33 is parallel to the longitudinal axis of LED board mounting post 30. The exemplary embodiment utilizes four mounting surfaces 33 arranged in a quad pattern.

Circuit board support 34 removably connects to circuit board 20 to allow LED boards 32a-32d to receive power from power supply 21 and commands from driver circuitry 22. Optionally, LED board mounting post 30 includes an airflow chamber 36 running along the longitudinal axis of LED board mounting post 30 between at least two post apertures 35a and 35b. Post apertures 35a and 35b are located at distal and proximal ends of LED board mounting post 30, respectively. Airflow chamber 36 allows forced air to enter and travel through LED board mounting post 30 to cool ParQuad 100 when it is in the airstream. Certain embodiments may also include additional infrared LEDs 37 mounted in frustoconical housing 40.

Frustoconical housing 40 includes an inner housing chamber 41, a parabolic reflective surface 42, at least four symmetrical reflective sections 43a-43d, at least four focal points 44a-44d, an outer housing surface 45, a housing edge 46, an adhesive layer 47, a circuit board hub 48 and a housing aperture 49. Frustoconical housing 40 may be constructed from aluminum, while inner housing chamber 41 may also be constructed from a polymer. Frustoconical housing 40 can be any size within standard PAR sizes, ranging from eight to two inches, or any custom diameter, ranging from one to fifty inches.

Inner housing chamber 41 includes a parabolic reflective surface 42. In the exemplary embodiment, parabolic reflective surface 42 is integral to frustoconical housing 40, such as, but not limited to a reflective coating vacuum-deposited on an inner surface. In other embodiments, parabolic reflective surface 42 is an inner surface of frustoconical housing 40 or is removably attached to an inner surface of frustoconical housing 40. Certain embodiments may also include additional infrared LEDs 37 mounted in parabolic reflective surface 42 of frustoconical housing 40.

Parabolic reflective surface 42 is designed in at least four symmetrical reflective sections 43a-43d that dissect parabolic reflective surface 42 into quadrants. Each symmetrical reflective section 43a-43d is specifically designed to optimize the Lambertian radiation pattern of LEDs 31a-31d. Another optimization means involves aligning a central axis of each LED 31a-31d with at least one of focal points 44a-44d. Still another optimization means involves aligning LED board mounting post 30 to form a vertical axis through the vertex of parabolic reflective surface 42.

Outer housing surface 45 mounts heat sink assembly 50 and includes a housing edge 46. Housing edge 46 may include a protuberant lip, a protuberance, a plurality of protuberant structures, a grooved surface and a flattened surface. In the exemplary embodiment, housing edge 46 mounts an adhesive layer 47 used to sealably attach lens 60. In alternate embodiments a bracket, a silicone or other polymer gasket or a threaded connection replaces adhesive layer 47.

Frustoconical housing 40 also includes a circuit board hub 48, into which circuit board 20 and LED board mounting post 30 are inserted. While circuit board 20 remain within circuit board hub 48 until removed, most of LED board mounting post 30 passes through housing aperture 49 and into the volume surrounded by inner housing chamber 41.

Heat sink assembly 50 bonds to outer housing surface 45. Heat sink assembly 50 may be constructed from aluminum. The primary purpose of the plurality of fins 51, which make up most of heat sink assembly 50 is to dissipate any heat generated during use of ParQuad 100. However, the plurality of fins 51 also provide support and strength to frustoconical housing 40, as well as facilitating insertion of ParQuad 100 into a cavity of an external structure. The number of the plurality of fins 51 may range from four to two hundred, while the size and shape of the plurality of fins 51 depends on the size and shape of the cavity. The plurality of fins 51 surrounds an assembly aperture 52 leading to the circuit board hub 48.

Lens 60 may be curved or flat glass of polymer, depending on the desired lighting effect. A contoured lens 60 can control the shape and/or intensity of a beam of light. Alternately, an inner surface of lens 60 may have a contoured surface to alter the shape and/or intensity of a beam of light. Lens 60 includes a lens aperture 61 through which the distal end of LED board mounting post 30 extends. Furthermore, in the exemplary embodiment lens 60 also includes a retaining ring 62 located around its outer edge. In the exemplary embodiment, retaining ring 62 interacts with the adhesive layer 47 of housing edge 46 to seal lens 60 to frustoconical housing 40.

Optional outer heat sink cap 70 includes an optional outer heat sink cap aperture 71 and a groove 72. The optional outer heat sink cap aperture 71 provides a pathway for air from the external environment to enter optional airflow chamber 36 of LED board mounting post 30 for cooling. Groove 72 holds an O-ring (not shown) that seals to the distal end of LED board mounting post 30 as it extends through lens aperture 61 so that no water can enter ParQuad 100. This also seals the interface between lens 60 and LED board mounting post 30.

What is claimed is:

1. A lighting fixture device, comprised of:
   a frustoconical housing, wherein said frustoconical housing has an inner housing chamber accessible by a housing aperture, wherein said inner housing chamber has a housing edge;
   a parabolic reflective surface within said inner housing chamber comprising a plurality of focal points, wherein said parabolic reflective surface has a plurality of symmetrical reflective sections, wherein each said plurality of symmetrical reflective sections has at least one focal point of said plurality of focal points;
   an LED board mounting post forming a vertical axis through the vertex of said parabolic reflective surface, wherein said LED board mounting post has at least one mounting surface;
   an outer heat sink cap sealably interconnecting said distal end of said LED board mounting post and a lens affixed to said housing edge, said outer heat sink cap having an outer heat sink cap aperture extending therethrough;
   a plurality of LED boards, wherein each of said plurality of LED boards comprises at least one LED, wherein each of said plurality of LED boards is affixed to said at least one mounting surface, wherein each of said plurality of LED boards is connected to a remainder of said plurality of LED boards such that malfunction of at least one LED or at least one of said plurality of LED boards does not affect functioning of another LED or another of said plurality of LED boards;
   a circuit board having a power supply and driver circuitry, wherein each of said plurality of LED boards is connected via a wire connection to a remainder of said plurality of LED boards and said to circuit board;
   wherein a central axis of each LED is aligned with at least one of said plurality of focal points.

2. The device of claim 1, wherein said plurality of symmetrical reflective sections comprises four symmetrical reflective sections.

3. The device of claim 1, wherein said plurality of symmetrical reflective sections comprises more than four symmetrical reflective sections.

4. The device of claim 1, wherein said housing edge is a geometric feature selected from a group consisting of: a protuberant lip, a protuberance, a plurality of protuberant structures, a grooved surface and a flattened surface.

5. The device of claim 1, wherein said parabolic reflective surface comprises an inner surface of said frustoconical housing.

6. The device of claim 1, wherein said parabolic reflective surface is integrally formed over an inner surface of said frustoconical housing.

7. The device of claim 1, wherein said parabolic reflective surface is removably attached to an inner surface of said frustoconical housing.

8. The device of claim 1, wherein said housing aperture is sealed with a cap.

9. The device of claim 1, wherein said plurality of LED boards comprise between four and one hundred LED boards.

10. The device of claim 1, wherein said at least one LED comprises between one and one hundred LEDs.

11. The device of claim 1, wherein said lens is affixed to said housing edge by a means selected from the group consisting of: an adhesive layer, a bracket, a silicone gasket, or a threaded connection.

12. The device of claim 1, wherein said lens is contoured to control the shape of a beam of light from said plurality of LEDs providing said beam of light.

13. The device of claim 1, wherein said lens is contoured to control the intensity of a beam of light from said plurality of LEDs providing said beam of light.

14. The device of claim 1, wherein an inner surface of said lens comprises a contoured surface.

15. The device of claim 1, wherein said lens comprises a lens aperture sized to accommodate passage of a distal end of said LED board mounting post.

16. The device of claim 1, further comprising a plurality of infrared LEDs mounted to said parabolic reflective surface, wherein said plurality of infrared LEDs emit light in the infrared spectrum.

17. The device of claim 1, further comprising a heat sink assembly, wherein said heat sink assembly comprises a plurality of fins bonded to an outer housing surface.

18. The device of claim 1, wherein said LED board mounting post further comprises at least one air flow chamber extending along a longitudinal axis of said LED board mounting post between a first post aperture at a distal end of said LED board mounting post and a second post aperture at a proximal end of said LED board mounting post.

* * * * *